United States Patent [19]

Wood, III

[11] 4,248,104
[45] Feb. 3, 1981

[54] METHOD OF AND MEANS FOR PROVIDING A CAM-ACTUATED, SPRING-RETURN MECHANISM WHEREIN THE TORQUE OUTPUT IS A FUNCTION OF THE CAM PROFILE

[75] Inventor: David B. Wood, III, Butler County, OH

[73] Assignee: Xomox Corporation, Cincinnati, Ohio

[21] Appl. No.: 820,927

[22] Filed: Aug. 1, 1977

[51] Int. Cl.³ ............................................. F16H 53/06
[52] U.S. Cl. ............................. 74/569; 74/424.8 VA; 251/251
[58] Field of Search .................... 74/569, 568 R, 567, 74/568 M, 424.8 VA; 251/336, 337, 251; 92/125, 170

[56] References Cited

U.S. PATENT DOCUMENTS

| | | | |
|---|---|---|---|
| 1,863,875 | 6/1932 | Rabezzana | 74/568 X |
| 1,939,912 | 12/1933 | McNeal | 251/337 |
| 2,606,257 | 8/1952 | Briskin | 74/568 X |
| 2,933,937 | 4/1960 | Kron et al. | 74/424.8 VA |
| 3,139,076 | 6/1964 | Flaherty | 74/569 X |
| 3,288,080 | 11/1966 | Madej | 92/170 X |
| 3,304,925 | 2/1967 | Rhoads | 74/569 X |
| 3,317,252 | 5/1967 | Gassman | 251/337 X |
| 3,512,421 | 5/1970 | Anderson | 74/424.8 VA |

FOREIGN PATENT DOCUMENTS

1237072  6/1971  United Kingdom ...................... 74/569

Primary Examiner—Samuel Scott
Assistant Examiner—Randall L. Green
Attorney, Agent, or Firm—Kinney and Schenk

[57] ABSTRACT

The profile of the cam, of a cam-actuated, spring-return mechanism of the type which includes a cam-shaft, a cam-follower, a cam-follower-shaft and spring means having a given spring rate and initial preload, is shaped in such a manner, that for a particular spring means, the torque output of the cam-shaft can be tailored to meet the torque requirements of a driven device, for the torque output can be constant throughout the return travel of the cam-induced displacement of the spring means to a compressed condition beyond its initial preload, whereby an infinite number of torque output characteristics may be obtained by altering or preselecting the cam profile only, while utilizing, unchanged, the other components of the mechanism.

49 Claims, 10 Drawing Figures

METHOD OF AND MEANS FOR PROVIDING A CAM-ACTUATED, SPRING-RETURN MECHANISM WHEREIN THE TORQUE OUTPUT IS A FUNCTION OF THE CAM PROFILE

BACKGROUND OF THE INVENTION

1. Field of the Invention

The field of the invention relates to spring return mechanisms of the type which are adapted to become activated to rotate the shaft of a control member, or the like, from one to the other of two normal positions whenever the force which initially rotated the control member shaft to the other said positions is released or becomes ineffective.

The invention is specifically directed to a cam-actuated, spring-return mechanism wherein the torque output characteristics of the mechanism are a predictable function of the profile of the cam for a particular spring means.

2. Description of the Prior Art

Applicant is unaware of any prior art which relates to, suggests or discloses a cam-actuated, spring-return mechanism.

SUMMARY OF THE INVENTION

The subject invention is directed to a unique and new concept in the field of spring-return mechanisms of the type which utilize resilient means, in the form of a spring, to impart a rotary motion, usually through 90°, to the shaft of a rotatable control member, or to the shaft of a rotatable power-driven actuator which turns the shaft of a control member in one direction only, such as from a closed to an open position, or vice versa.

Each control member has particular torque characteristics which can be plotted as a torque curve wherein the ordinate is expressed in torque and the abscissa in degrees of stroke from 0° to 90° when rotating the shaft of the control member first in one direction, viz. opening, and then in the opposite direction, viz. closing.

The subject invention imparts a "tailored" turning torque to a cam-shaft, the cam of which is disposed in driving-driven relationship with the cam-follower of a cam-follower-shaft which is interposed between the cam and spring means which are compressed beyond an initial preload condition incident to displacement of the cam-follower and cam-follower-shaft by the application of a turning torque, in one direction to the cam-shaft by an external source. The profile of the cam is designed in such a manner, in terms of the spring rate and initial preload of the particular spring means used, whereby to provide an output torque characteristic to the cam-shaft which will duplicate or closely match the torque requirements of a control member on either the opening or closing thereof.

The primary objects of the present invention are:

a. The provision of a cam-actuated, spring return mechanism which is capable of being tailored, or "torque characterized" to meet any special application requirements;

b. To provide such a mechanism which is characterized by its simplicity of design, ease of manufacture, inherent reliability, and trouble-free operation;

c. To provide such a mechanism in a compact, unitary package which is easily mounted on or relative to actuators, control members, or the like;

d. To provide such a mechanism the torque output of which is defined by a constant torque output curve.

In passing, it will be noted that whereas certain prior art actuators of the vane or rack and pinion piston types have constant torque outputs, said actuators cannot provide or offer constant torque outputs on a spring-return actuator by reason of the physical characteristics of springs in general, and more importantly because of the mechanisms required and used to transmit and then convert the spring forces to torque.

The unique design of the cam and its relationship with the spring return means allows the cam/spring combination to be characterized or tailored to compensate for the action of the spring in order to produce a constant torque output, or any other output characteristic that may be desired.

As used herein the term "control member" refers to a device, such as a valve, damper, etc. having a rotatable shaft which controls the position of flow control means within the member. The term "actuator" refers to a device which is powered by air, fluid, etc. for rotating its shaft in one direction, from one position to another. The actuator shaft is directly, or indirectly, disposed in driving relationship with the shaft of the control member for initially turning the flow control member from one to the other of its on or off positions, and of thereafter maintaining said means in that position until the media by which the actuator is powered is released or impaired.

The term "spring-return mechanism" refers to a device, and, in particular, to the present cam-actuated, spring-return mechanism, the shaft of which is adapted to be initially rotated in one direction by the "actuator" against the counterforce of the spring means of the mechanism, and there maintained until such time as the media which powers the actuator is released or impaired. Upon cessation or impairment of the application of power media to the actuator, the aforesaid spring means will automatically impart a driving force to the cam of the mechanism sufficient to rotate the shaft thereof and the shafts of the control member and actuator in a reverse or opposite direction for closing or opening the flow control means of the control member, as the case may be.

Figure 1:
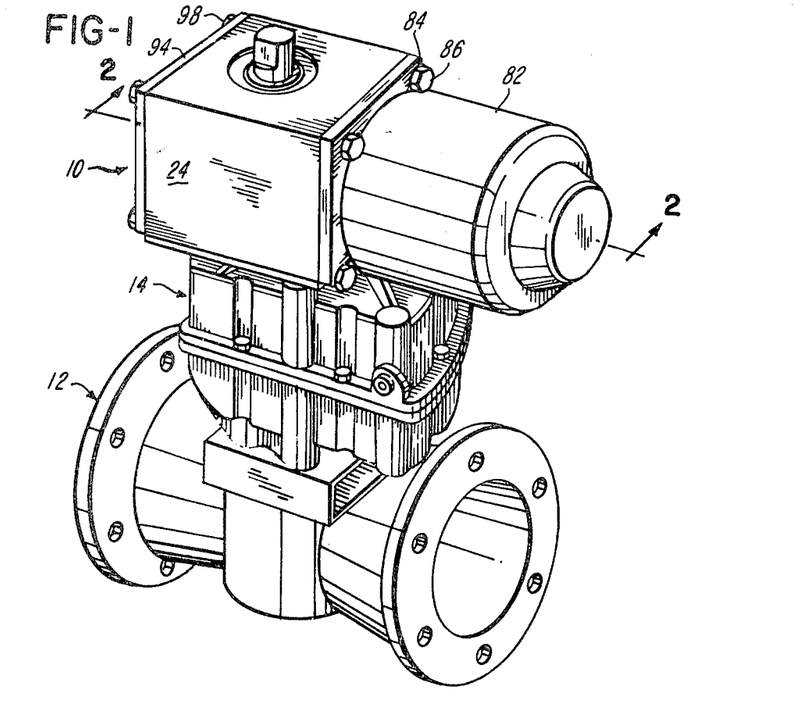
FIG. 1 is a perspective view of a cam-actuated, spring-return mechanism of the present invention operatively associated with an actuator for a control member such as, by way of example, a valve.

As illustrated in FIG. 1, the cam-actuated, spring return mechanism 10 may be mounted on top of an actuator 14 which is mounted on top of control member 12, it being understood that the shafts of each of said devices are disposed in aligned, interconnected, end-to-end relationship, whereby the application of power media to the actuator will simultaneously rotate the shafts of the spring return mechanism and control member in the same direction and by the same amount as the flow control means of said control member is initially rotated from a first to a second position. When the spring return mechanism becomes activated such as upon release of power media in or to the actuator, the shaft of said mechanism drives and rotates the shafts of the control member and actuator from the second position back to the first position.

Figure 5:
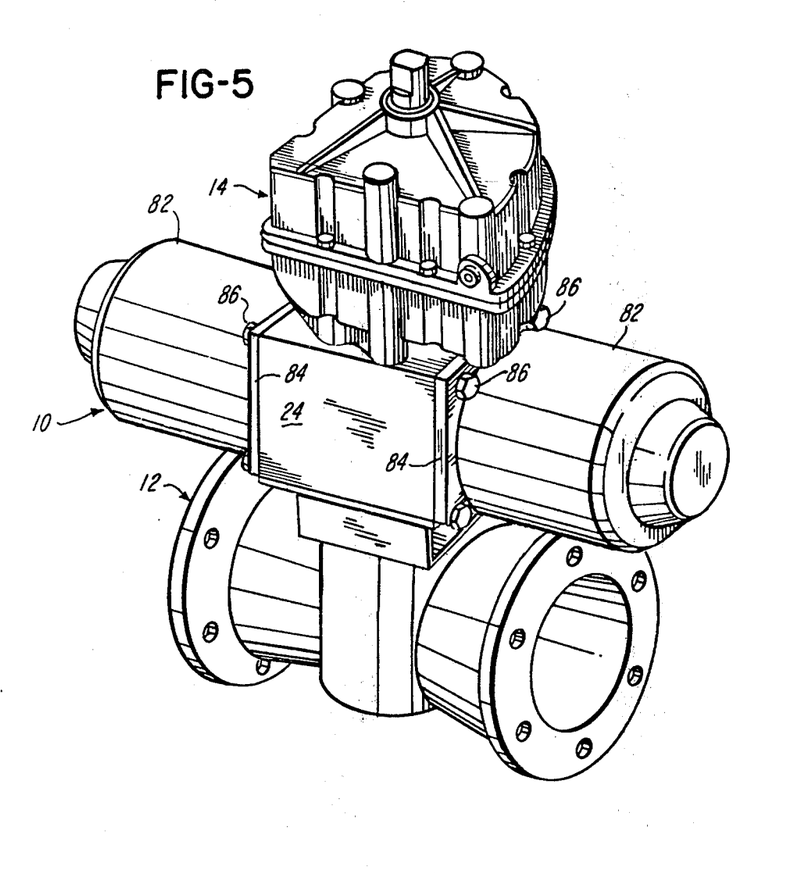
FIG. 5 is a perspective view of double cam-actuated, spring-return mechanism which is positioned between an actuator and a control member.

In FIG. 5, the preferred relationship between the spring-return mechanism, actuator and control member is illustrated, wherein the spring return mechanism 10 is located between the actuator 14 and control member 12, for thereby providing a fire-safe arrangement in that the operating characteristics of the cam-actuated, spring return mechanism 10 will remain unimpaired and fully operative because the housings of said mechanism are fabricated from ductile iron and steel, whereas the body of the actuator 14 is fabricated from aluminum, and the like, which is destroyed or adversely effected when subjected to high temperatures. By mounting the actuator 14 on top of the spring return mechanism 10, as in FIG. 5, distortion or damage to the actuator 14 will not adversely effect the mounting or operating characteristics of the mechanism 10 as could be the case in the arrangement of parts as in FIG. 1.

DESCRIPTION OF THE PREFERRED EMBODIMENTS

With particular reference to FIGS. 1 and 5, the numeral 10 denotes generally a cam-actuated, spring-return mechanism of the present invention; 12 denotes a typical control member such as, by way of example, a valve, and 14 denotes generally a typical power actuator which is disposed in driving relationship with the shaft of the control member 12.

In FIG. 1 the actuator 14 is illustrated as being disposed between the cam-actuated, spring-control mechanism 10 and the control member 12, whereas in FIG. 5 the cam-actuated, spring-control member 10 is illustrated, in the preferred location, that is, between the actuator 14 and the control member 12. The present invention is neither concerned with nor directed to the specific structural details of the control member 12 nor of the actuator 14, however reference is made to U.S. Pat. No. 3,554,096, assigned to the assignee of the application, for a detailed description of a typical actuator. The control member 12 may comprise any valve, damper or the like which includes a valving member, plate or the like which is rotatable through 90° between first and second, viz. open and closed positions.

The application of control media to actuator 14 is adapted to rotate the shaft of a control member in one direction only from one to the other of its two positions, that is, from closed position to open position, or from open position to closed position and maintain the said shaft in that position so long as the control media is applied.

The purpose of the cam-actuated, spring-return mechanism 10 is to quickly, efficiently and automatically rotate the shaft of the control member 12 in an opposite direction whenever the control media to the actuator 14 is released or becomes ineffective for its intended purpose, wherein the torque output of the said spring-return mechanism has been tailored to meet the torque requirements of the control member 12.

Figure 2:
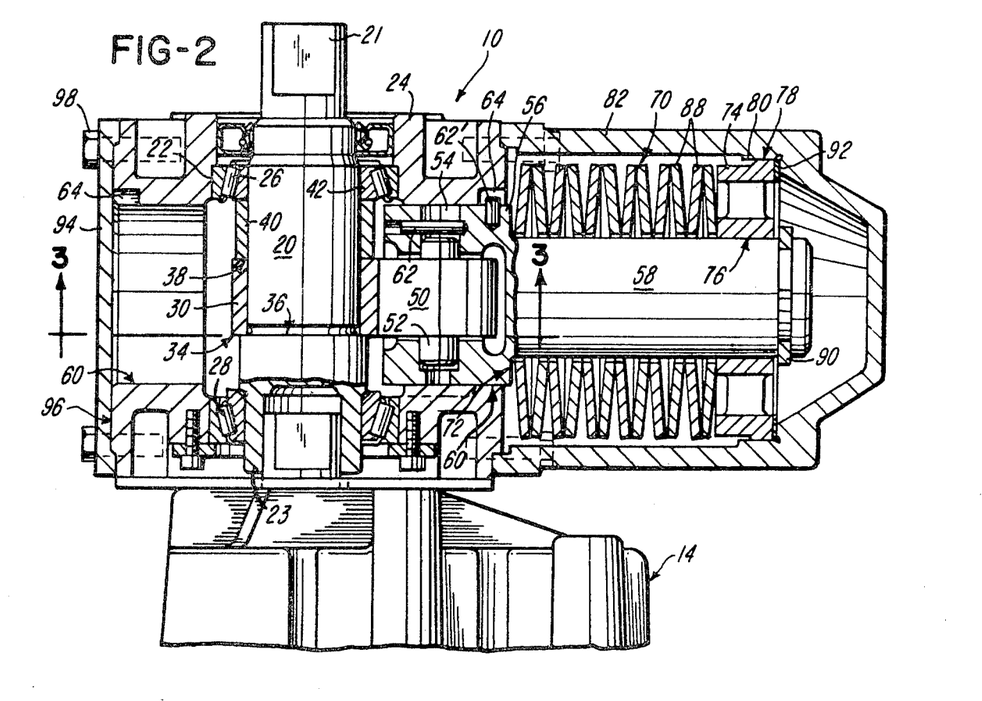
FIG. 2 is a vertical sectional view taken on line 2—2 of the cam-actuated, spring return mechanism, per se, of FIG. 1.

With particular reference to FIG. 2, a cam shaft 20 is journaled for rotation within an axial bore 22 of a housing 24 and against end-wise axial movement by means of tapered bearings 26 and 28 which are disposed adjacent opposite ends of the cam shaft 20, by suitable means as clearly illustrated in FIG. 2.

A cam 30 is securely though releasably secured to the cam shaft 20 by means of a key 32 (FIG. 3) wherein one end 34 (FIG. 2) of the cam 30 engages an annular offset 36 of the cam shaft 20 and wherein the other end 38 engages a cam spacer 40 interposed between the cam 30 and an inner raceway 42 of the bearing assembly 26.

A cam-follower 50 is rotatably mounted on a dowel pin 52, which is received within a bore 54 of a forwarded, enlarged, cylindrical end 56 of a cam-follower-shaft 58, the end 56 being received within a cam-follower-shaft receptive bore 60 of the housing 24.

It will be noted that the cam-follower-shaft receptive bore 60 intersects and is disposed at right angles with respect to the cam-shaft receptive bore 22.

The dowel pin 52 is maintained within the bore 54 by means of an elongate set screw 62.

The relationship between the adjacent surfaces of the enlarged end 56 of the cam-follower-shaft 58 and the bore 60 of the housing 24 is such as to provide a slip fit whereby the cam-follower-shaft 58 is mounted for free endwise movement within said bore 60. The enlarged end 56 of the cam follower shaft 58 may be provided with a guide pin 62', for assembly purposes only, wherein said guide pin 62' is received within an elongate slot 64 the bore 60.

Spring means denoted generally by the numeral 70 are secured to and carried by the cam follower shaft 58, between an annular abutment 72 and a spacer 74. Said spacer includes an inner axial bore 76 which slideably engages the outer periphery of the cam-follower-shaft 58, said spacer 74 also including an outer axial surface 78 which is slidably received within an annular seat 80 of a spring housing 82, the inner end of the housing 82 terminates in an enlarged mounting plate 84 (see FIGS. 1 and 5), wherein said mounting plate 84 is securely though releasably fastened to the housing 24 by means of bolts 86.

Figure 4:
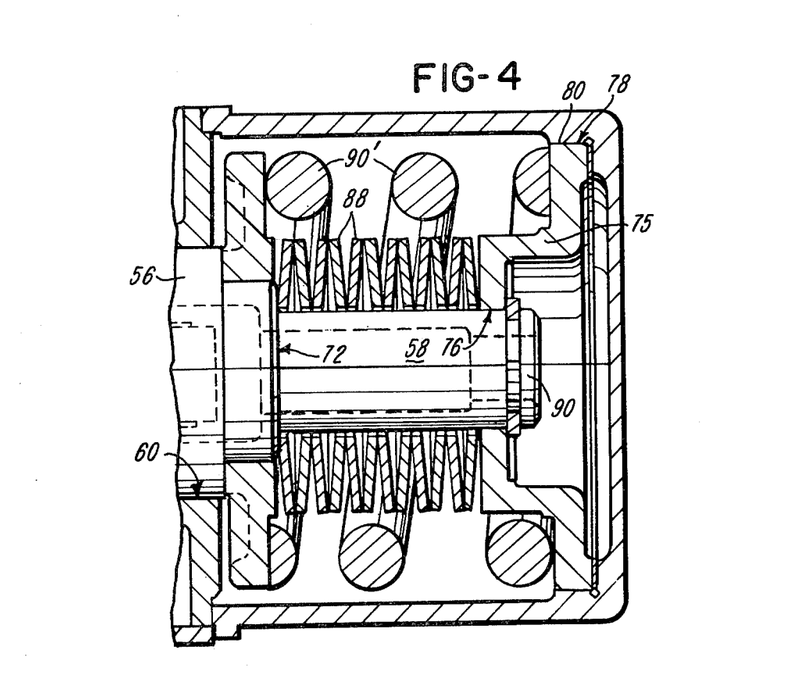
FIG. 4 is a sectional view of an alternate type of spring means.

The spring means 70 having a known spring rate may comprise a plurality of Belleville washers 88 as illustrated in FIG. 2, or a coil spring, or a combination of Belleville washers 88 and a coil spring 90', as illustrated in FIG. 4.

The spring means 70, assembled as in FIG. 2, are provided with an initial preload by means of a pair of split rings 90 which are received in a groove in the shaft 58 to take the axial thrust of the spring means. One or more preload shims 92 may be utilized for imparting a desired preload to the spring means 70 via the spacer 74. The rings 90 are preferably tack-welded together to prevent their accidental or unintentional disengagement from the shaft 58, thereby providing a safe-to-insert-and-remove preloaded spring assembly.

It should be understood that the spring means 70 is initially preloaded while the cam-follower-shaft 58 and its associated cam-follower 50 are removed from association with the housing 24 and the before spring housing 82 is introduced over said spring means 70.

It will be understood that rotation of the cam 30 through 90 degrees will displace the cam-follower 50 and the cam-follower-shaft 58 against the counterforce of the spring means 70, from the initial, forward or advanced position of FIG. 2, to a rearward position wherein the spring means 70 is compressed beyond its initial preload by the amount of travel of the cam-follower-shaft 58.

Figure 3:
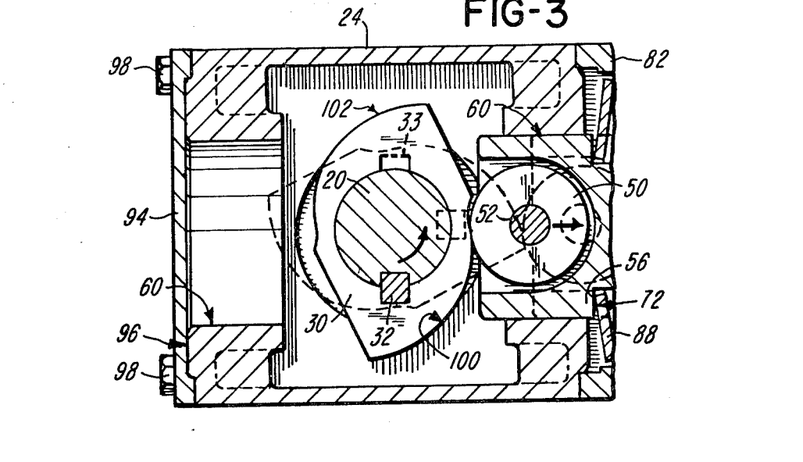
FIG. 3 is a sectional view taken on line 3—3 of FIG. 2.

With particular reference to FIG. 3, it will be noted that the profile of cam surface 100 is a duplicate of the profile of cam surface 102, whereby to provide a second cam surface 102 which can be utilized in the event of wear or damage to the first cam surface 100 by removing the key 32, rotating the cam 30 through 180° on the cam shaft 20 and reinserting the key 32 into an auxilliary key-way slot 33 indicated in broken outline in FIG. 3.

The duplicate cam-surfaces 100 and 102 also facilitate the construction of a cam-actuated, spring-return mechanism having a pair of duplicate cam followers 50, cam-follower-shafts 58, spring means 70 and spring housings 82, as in the mechanism illustrated in FIG. 5. However, if desired, the cam 30 may be fabricated having but one cam surface 100.

The subject invention is unique in that, by pre-selecting or designing a particular cam profile, the torque output of the cam shaft 20 can be tailored to duplicate the output characteristics of any of the presently known, currently used spring return mechanisms, or said torque can be tailored to meet the torque requirements of a driven device, such as, by way of example, the control member 12, without necessitating a change in the size or structural details of the housing 24, the spring housing 82, cam the follower 50 and/or its associated spring means 70.

In those instances in which the mechanism is provided with a single cam follower, cam follower shaft and spring means as in FIGS. 2 and 3, a closure plate 94 is suitably secured to outer axial surface 96 of the housing 24 by means of bolts 98 or the like.

In FIG. 4, the numeral 75 designates a modified form of the rear of the spacer 74 of FIG. 2.

It will be understood that one or the other or both ends of the cam-shaft 20 are provided with flats 21, or with non-circular shaft-receptive sockets 23, which are adapted to be disposed in driving-driven relationship with rotatable shafts of the actuator 14 and/or of the control member 12, whereby the cam shaft 20 will be quickly, effectively and automatically rotated by means of the cam-actuated, spring driven force of the cam follower 50 against the profile of the cam 30 incident to and whenever the actuating force of the actuator 14 is released or becomes inoperative, for thereby rotating the shaft of the control member 12 in a direction counter to the direction in which said shaft was initially rotated by the actuator 14.

A special and prime feature of the present invention is the provision of a cam-actuated, spring control mechanism which is characterized by a constant output torque which is advantageous in the operation of many types of valves, dampers and the like that have relatively constant torque requirements. It has been found that many types of valves that do not have a constant torque requirement in an on-off application, approach a constant torque requirement in throttling or modulating applications.

Although certain actuators of the vane or rack-and-pinion piston type are capable of producing a constant torque output, such output has not been heretofore obtainable from spring-type actuators, partly because the physical characteristics of springs in general, but primarily because of the mechanisms which are used to transmit the spring forces converting them to torque.

In the present invention, the contour or profile of each of the cam surfaces 100 and 102 of the cam 30 is designed in such a manner as to compensate for the operating characteristics of the spring means 70 in order to produce a constant torque output, or other desired torque output to the cam shaft 20.

DERIVATION OF CONSTANT TORQUE CAM

Figure 6:
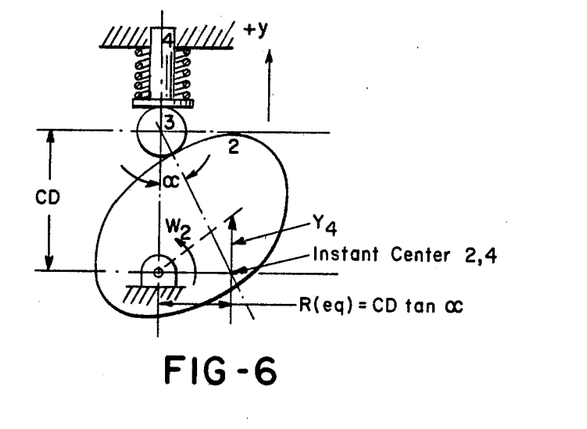
FIG. 6 is a sketch which illustrates, in general, the manner in which spring forces are transmitted through a cam to produce torque.

For ease of understanding, reference is made to the illustration of sketch "a" which illustrates, in general, the manner in which spring forces are transmitted through a cam to produce torque.

From the foregoing and FIG. 6 it will be noted that the spring forces at any position can be resolved into a component acting along a line of action, which is always perpendicular to the plane of the contacting surfaces. The line of action and a line connecting the center of the cam follower and the center of rotation of the cam intersect to form an angle, which is the pressure angle ($\alpha$). This component of spring force can then be multiplied by the distance [R(eq)] along a line, which is perpendicular to the line connecting the center of the cam follower and the center of rotation of the cam, between the line of action and the center of rotation of the cam to calculate the torque generated at the cam for that particular position of the mechanism as repeated for each new position of the cam and follower.

It is possible and practical, however, to develop a much simpler, more meaningful expression for torque by using the method of instant centers, a kinematic tool for velocity analysis. An instant center (such as instant center 2,4) is a point where two members in a mechanism will have the same instantaneous velocity. The point does not always fall on either body, nor do the bodies have to be in direct contact with each other.

In instant center 2,4 the point of common velocity between the cam 30 and the cam-follower-shaft 58, will always fall at the intersection of the line of action and a line, which is perpendicular to the line connecting the center of the cam follower and the center of cam rotation, as shown in sketch "a", for any position of the mechanism. The instantaneous velocity of the cam follower shaft, then, is:

$$\dot{Y}4 = w2 \, (CD \tan \alpha) \text{ (or)}$$
$$\dot{Y}4 = w2 \cdot R(eq) \text{ and}$$

$$R(eq) = \frac{\dot{Y}4}{w2}$$

where R(eq) (radius equivalent) is the distance along a line, which is perpendicular to the line connecting the center of the cam follower and the center of rotation of the cam, from the center of rotation of the cam to the intersection of the line of action. The instantaneous velocity is derived from the basic kinematic relationship $V = RW$.

To convert this velocity relationship to a force/-torque relationship, the principle of conservation of energy is used, and, ignoring all losses, the energy input must equal the energy output:

$$\text{Energy in} = \text{Energy out}$$
$$\frac{\text{Force} \times \text{distance}}{\text{Time}} = \frac{\text{Torque} \times \text{Angle}}{\text{Time}}$$

or: force × velocity = torque × angular velocity; which is $$F \times \dot{Y}4 = T \times w2$$
$$T = F \frac{\dot{Y}4}{w2}$$

but since $R(eq) = \frac{\dot{Y}4}{w2}$ (1) then $T = F \times R(eq)$

This equation gives a simple relationship between the spring force (F) and the torque output (T) for a cam system in general which is true for all points of rotation provided that F and R(eq) are known for each point. If F and R(eq) can be described as a continuous function of rotation, then the equation will give a continuous description of output torque.

In order to develop a cam/spring system that produces constant torque, the product of F times R(eq) must remain constant.

The spring force (F) is a function of the spring's total deflection at any instant (Y4) times its spring rate. R(eq) is a function of the instantaneous velocity of the cam follower ($\dot{Y}4$) as previously developed $$(R(eq) = \frac{\dot{Y}4}{w2}).$$

Figure 7:
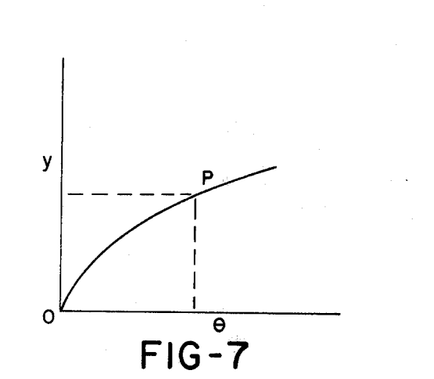
FIG. 7 is a sketch illustrating cam follower rotation plotted against cam rotation.

In order for the product of the two to remain constant, the cam must be of such a mathematical function such that the cam-follower-shaft displacement (Y4) times its first derivative or cam follower shaft velocity ($\dot{Y}4$) remains constant. This means that the first derivative of displacement must be equal to the reciprocal of the displacement times a constant; and a parabola has that mathematical characteristic, as evidenced from the sketch depicted in FIG. 7.

$$\frac{dy}{d\theta} = \frac{1}{2}(2P\theta)^{-\frac{1}{2}} \times 2P = P(2P\theta)^{-\frac{1}{2}} = \frac{P}{(2P\theta)^{\frac{1}{2}}}$$

This $$(\frac{dy}{d\theta} \text{ or } \dot{Y}_4)$$

is equal to the reciprocal of the original function times the constant P. Torque is proportional to:

$$T \approx y_4 \times \dot{y}_4 \text{ or}$$
$$T \approx y \times \frac{dy}{d\theta}$$

which for the parabola becomes:

$$T = (2P\theta)^{\frac{1}{2}} \times \frac{P}{(2P\theta)^{\frac{1}{2}}} = P(\text{constant})$$

This demonstrates that a parabola is the correct mathematical function for cam follower displacement versus cam rotation to achieve a constant torque output.

In the preferred embodiment of the invention the "designed" cam is small, limited to 90° rotation and has a short stroke, that is, it will produce a short cam-follower-displacement, with the result that only a small segment of a general parabola is used.

General Parabola:
$y = \sqrt{2P\theta}$ or $y^2 = 2P\theta$
Solving for $\theta$:

$$\theta = \frac{y^2}{2P} \tag{2}$$

Figures 8, 10:
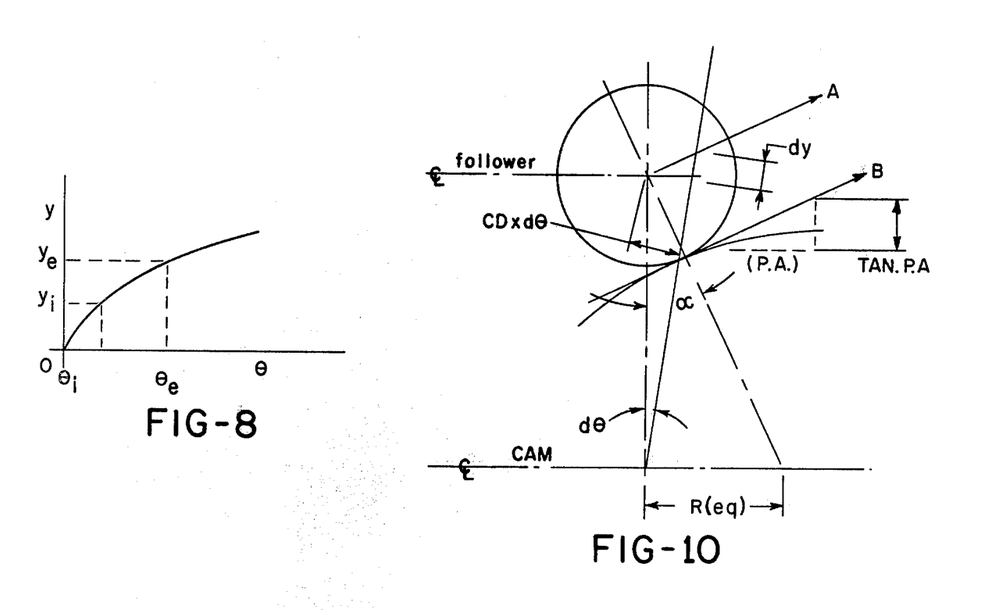
FIG. 8 is a second sketch illustrating cam follower rotation plotted against cam rotation.
FIG. 10 is a sketch demonstrating that the instantaneous change in cam follower position must be equal to the instantaneous tangent of the pressure angle of the cam.
Figure 9:
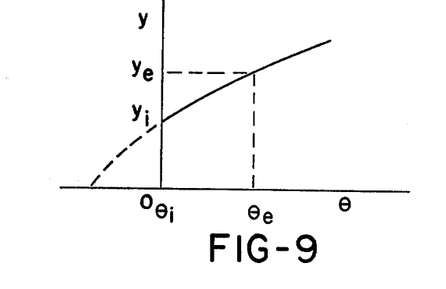
FIG. 9 is a sketch illustrating cam follower rotation plotted against cam rotation similar to FIG. 8 but showing a shifting of the axis.

When using a small portion of the parabola, the equation becomes:

$$y = \sqrt{2P[\theta_i + \frac{2\theta}{\pi}(\theta_e - \theta_i)]} \quad (\theta = \text{Radians})$$

The aforesaid equation shifts the axis of the parabola of the sketch FIG. 8 to the location in the sketch of FIG. 9.

Multiplying by 2P as indicated, the equation becomes:

$$y = \sqrt{2P\theta_i + \frac{2\theta}{\pi}(2P\theta_e - 2P\theta_i)}$$

substituting from equation (2) gives:

$$y = \sqrt{yi^2 + \frac{2\theta}{\pi}(ye^2 - yi^2)} \tag{3}$$

To insure proper cam follower path, the instantaneous change in cam follower position (lift) must be equal to the instantaneous tangent of the line of action, which changes with the pressure angle of the cam:

For Vectors A & B in FIG. 10 to be parallel which the Vector A represents the lift and the Vector B represents the line of action, the slopes of the Vectors A and B must be equal so that:

$$\frac{dy}{CD \times d\theta} = \text{TAN } P.A. \text{ but:} \tag{4a}$$
$$\text{TAN } P.A. = \frac{R(eq)}{CD} \text{ so that:}$$
$$\frac{dy}{CD \times d\theta} = \frac{R(eq)}{CD} \text{ or:}$$
$$\frac{dy}{d\theta} = R(eq)$$

Differentiating equation (3) to find R(eq) gives:

$$(4b) \frac{dy}{d\theta} = \frac{ye^2 - yi^2}{\pi \sqrt{yi^2 + \frac{2\theta}{\pi}(ye^2 - yi^2)}} = R(eq)$$

@ $\theta = 0$ @ $\theta = \frac{\pi}{2}$ $$(4c) R(eq) = \frac{ye^2 - yi^2}{\pi yi} \qquad (4d) R(eq) = \frac{ye^2 - yi^2}{\pi ye}$$

R(eq), as described previously, represents the effective moment arm at any point that the spring force is multiplied by to get the resulting torque at any point.

Equation (1) is the torque equation:

$$T = F \times R(eq)$$

The spring force is:

$$F = Fi + (y - yi)R$$

where:

$Fi$ = initial spring force (preload)
$R$ = Spring Rate
$Ra$ = average spring over the working range $(ye - yi)$ $$Y = \sqrt{yi^2 + \frac{2\theta}{\pi}(ye^2 - yi^2)} \text{ from Equation (3) so that,:}$$

$$F = Fi + Ra \left[ \sqrt{yi^2 + \frac{2\theta}{\pi}(ye^2 - yi^2)} - yi \right]$$

multiplying by $R(eq)$ (Eq. 4b), the torque equation becomes:

$$T = \left( Fi + Ra \left[ \sqrt{yi^2 + \frac{2\theta}{\pi}(ye^2 - yi^2)} - yi \right] \right) \left( \frac{ye^2 - yi^2}{\pi \sqrt{yi^2 + \frac{2\theta}{\pi}(ye^2 - yi^2)}} \right) \quad (5)$$

Equation (5) represents the general torque equation that can be used when a non-linear spring such as a "Bellville disk spring" is employed. The spring rate $(Ra)$ is the average spring rate over the working range $(Ye - Yi)$ and is very close to constant for a small working range. If the spring rate is not exactly constant, the torque output will not be "theoretically constant", but for all practical purposes will be very close to constant.

When a true constant rate spring is used, equation (5) can be simplified by making the substitution:

$$Fi = R \cdot yi \quad (6)$$

substituting and factoring R since $Ra = R$:

$$T = \left( R \left[ yi + \sqrt{yi^2 + \frac{2\theta}{\pi}(ye^2 - yi^2)} - yi \right] \right) \left( \frac{ye^2 - yi^2}{\pi \sqrt{yi^2 + \frac{2\theta}{\pi}(ye^2 - yi^2)}} \right)$$

gives the final torque equation:

$$T = \frac{R(ye^2 - yi^2)}{\pi} \text{ (Constant)} \quad (7)$$

Equation (7) gives the relationship between a theoretically constant torque output, a constant spring rate, for a specific segment of a general parabola that is used to generate the cam profile.

The initial spring preload required is that described by equation (6).

From the foregoing it should be understood that as the cam rotates against the initial preload, the spring means are compressed according to equation (3), wherein y = displacement of the cam-follower, cam-follower-shaft and spring; yi and ye are the initial and ending ordinates, respectively, of the segment of the parabola used in defining the cam follower displacement; and $\theta$ is the radians through which the cam is rotated.

The aforesaid cam-actuated, spring-return mechanism represents an important and major breakthrough in spring return actuator design, since it has the unique capability of being torque "characterized" to meet any special application requirements with only minor changes to the mechanism and with no changes in the operating concepts.

To summarize, the profile of the cam surface 100 is such as to require application of the same amount of turning torque to the cam-shaft 20 in order to rotate the cam 30 in a counterclockwise direction, as illustrated in FIG. 3, from its low to its high point for displacing the cam-follower 50, the cam-follower-shaft 58 and the spring means 70 (FIG. 2) against the counter force of said spring means 70 (beyond the initial preload of the spring means 70) as the amount of torque which is imparted to the cam shaft 20 upon release of the force on the cam shaft 20 which initially resulted in displacement of the cam-follower 50, the cam-follower-shaft 58 and the spring means 70. The profile of the cam surface 100 is such that the spring-induced forces applied to the cam-follower 50 via the cam-follower-shaft 58 will automatically rotate the cam 30 from its high to its low point while applying a reverse-direction turning torque to the cam shaft 20 which is equal to the torque initially applied to said shaft 20.

What is claimed is:

1. The method of providing a cam-actuated, spring-return mechanism of the type which includes a cam on a rotatable cam shaft rotatable a maximum of less than 360° from a first position to a second position in one direction by an external torque, a spring to return the cam shaft from its second position to its first position when the external torque ceases to act on the cam shaft, and a cam follower between the cam and the spring, with the cam shaft having a predetermined torque output curve when the cam shaft is returned from its second position to its first position by the force of the spring acting on the cam follower, which comprises the steps of:
   a. determining the cam profile required to achieve the predetermined torque output curve;
   b. and selecting a spring having the proper spring rate and load characteristics to provide the desired magnitude of force through the cam follower to the cam shaft so that the cam shaft has the predetermined torque output curve.

2. The method of correlating the cam/spring relationship of a cam-actuated, preloaded, spring-return mechanism having a cam-follower and cam-follower-shaft interposed between the cam and spring to the maximum constant torque requirements of a device in driven relationship with said mechanism, which comprises the steps of:
   a. determining the constant torque requirements of the device to be driven by said mechanism;
   b. satisfying said constant torque requirements in said mechanism by providing a relationship between the cam, and a non-linear, preloaded spring according to the equation:

$$T = \left( Fi + Ra \left[ \sqrt{yi^2 + \frac{2\theta}{\pi}(ye^2 - yi^2)} - yi \right] \right)$$

$$\left( \frac{ye^2 - yi^2}{\pi \sqrt{yi^2 + \frac{2\theta}{\pi}(ye^2 - yi^2)}} \right)$$

wherein:
T = torque
Fi = initial preload spring force Ra-yi.
Ra = average spring rate over the working range (ye-yi)
θ = radians through which the cam is rotated
yi and ye = the initial and ending ordinates of the segments of a parabola which define the working range (lift) of the cam.

3. A method as called for in claim 2, but wherein, in step "b" thereof, a preloaded, linear spring which has a true constant spring rate is utilized for providing a constant torque to said mechanism according to the equation:

$$T = \frac{R(ye^2 - yi^2)}{\pi}$$

wherein
T = torque
R = the spring rate over the working range ye−yi
yi and ye = the initial and ending ordinates of the segments of a parabola which defines the working range (lift) of the cam.

4. A cam-type spring-return mechanism, which includes a cam shaft rotatable for a maximum of less than 360° in either direction, a cam mounted on said shaft, spring means having a given spring rate and an initial pre-load, and a cam follower and a cam follower shaft interposed between said cam and said spring means with the cam follower shaft having its longitudinal axis substantially normal to the longitudinal axis of said cam shaft and the cam follower supported by the cam follower shaft, wherein the profile of the cam is such as to impart a particular relationship to the cam follower displacement to precisely control the spring forces of said spring means to produce a specific or characteristic torque output curve by the cam shaft incident to the application of compressive forces to the spring means by the cam follower shaft and release of the compressive forces by the spring means to the cam follower shaft.

5. In a mechanism as called for in claim 4, wherein the profile of the cam is parabolic and produces a constant torque output.

6. A cam-type spring-return mechanism comprising:
a. a first housing having a centrally disposed cam shaft-receptive bore and an axially aligned cam-follower-shaft-receptive bore, normal to, and intersecting said cam shaft-receptive bore;
b. a cam shaft rotatably mounted in said cam shaft bore and rotatable a maximum of less than 360° from a first position to a second position in one direction by an external torque applied to said cam shaft;
c. a cam on said cam shaft having a portion of its cam surface with a profile that is parabolic;
d. a cam-follower-shaft reciprocally mounted in said cam-follower-shaft-receptive bore;
e. a cam-follower rotatably journaled to an end of said cam-follower-shaft;
f. spring means engaging said cam-follower-shaft for disposing and maintaining the cam follower in contacting relationship with the cam surface of said cam; wherein
g. the profile of the cam surface is such that for a given spring rate and initial pre-load of the spring means, the torque output applied to the cam shaft by said cam via the cam follower incident to release of the spring means induced displacement of the cam-follower-shaft is specifically tailored to satisfy the torque requirements of a device to be disposed in driven relationship with the cam shaft to be driven by rotation of said cam shaft in the opposite direction from its second position to its first position when the external torque is no longer applied to said cam shaft and wherein the torque required to rotate the cam shaft against the counterforce of the spring means from an initial, forward, pre-load position to a retracted, compressed position is equal to the torque applied to said cam shaft via the cam, cam-follower and cam-follower-shaft upon movement of the cam-follower-shaft incident to release of the spring means from its compressed position to its initial position.

7. A mechanism as called for in claim 6, wherein displacement of the cam-follower shaft incident to rotation of the cam follows the path of a parabolic curve.

8. A mechanism as called for in claim 6, which includes means for adjusting the initial pre-load on the spring means.

9. A mechanism as called for in claim 6, which includes means for adjusting the initial pre-load on the spring means, wherein said adjusting means includes a guide means having an axial opening therethrough for slidably receiving the cam-follower-shaft at a location remote from the cam-follower; means secured to and carried by the outer end of the cam-follower-shaft for securing said guide means relative to said cam-follower-shaft and against one end of the spring means for imparting an initial pre-load to said spring means, a second housing for said cam-follower-shaft and said spring means, means for securely though releasably securing said second housing to said first housing for disposing the guide means in predetermined relationship with respect to the cam shaft and wherein the torque required to compress the spring means beyond its initial pre-load incident to rotation of the cam in the one direction is constant and equal to the torque imparted to the cam by the cam follower in rotating the cam in the opposite direction upon return of the spring means from its compressed condition to its initial pre-load condition.

10. A mechanism as called for in claim 6, wherein the torque required to compress the spring means beyond its initial pre-load incident to rotation of the cam in the one direction is constant, and wherein the torque imparted to the cam by the cam-follower in rotating the cam in the opposite direction incident to return of the spring means from a compressed to its initial pre-load is constant.

11. A mechanism as called for in claim 6, wherein the spring means comprises a stack of Bellville spring washers.

12. A mechanism as called for in claim 6, wherein the spring means comprises a coil spring.

13. A mechanism as called for in claim 6, wherein the spring means comprises a stack of Bellville spring washers in combination with a coil spring.

14. A mechanism as called for in claim 9, wherein pre-load shims are interposed between adjacent surfaces of the guide means and the second spring housing.

15. A mechanism as called for in claim 6, wherein the output torque characteristics of the mechanism are a function of the profile of the cam surface, whereby the torque output characteristics of a given mechanism may be altered to meet a particular torque requirement by changing the profile of the cam and wherein the profile of the cam is such that during a 90° rotation of the cam in one direction it will change from a low to a high radius to displace the cam-follower and cam-follower-shaft from a fully advanced to a fully retracted position against the counterforce of the said spring means, and wherein the cam is rotated through 90° in an opposite direction incident to the spring-means-induced movement of the cam-follower of the cam-follower-shaft against said cam.

16. A mechanism as called for in claim 6, wherein means are provided on the cam-follower-shaft for selectively controlling the pre-load of the spring means in terms of the spring rate.

17. A cam-type spring-return mechanism comprising:
   a. a housing having a centrally disposed cam-shaft-receptive bore and a pair of axially aligned cam-follower-shaft receptive bores, normal to, on opposite sides of and intersecting said cam-shaft-receptive bore;
   b. a cam shaft rotatably mounted in said cam-shaft receptive-bore and rotatable for a maximum of less than 180° from a first position to a second position in one direction by an external torque applied to said cam shaft;
   c. a cam on said cam shaft having a pair of duplicate cam surfaces having identical profiles which are disposed 180° with respect to one another;
   d. duplicate cam-follower-shafts reciprocally mounted one in each of said cam-follower-shaft receptive bores;
   e. duplicate cam-followers rotatably journaled one to and end of each of said cam-follower-shafts;
   f. duplicate spring means engaging said cam-follower-shafts for disposing and maintaining each cam follower in contacting relationship with corresponding portions of the duplicate cam surfaces of said cam; wherein
   g. the profile of each cam surface is such that for a given spring rate and initial pre-load of the spring means, the torque applied to the cam shaft by said cam via the cam-followers incident to release of the spring means-induced return displacement of the cam-follower-shafts is tailored to duplicate the torque requirements of a device to be disposed in driven relationship with said cam shaft when said cam shaft is rotated in the opposite direction from its second position to its first position at the time that the external torque is no longer applied and
   h. wherein the torque required to displace the cam-follower-shafts from initial forward positions to retracted positions equals the torque applied to said cam surfaces via the cam-followers incident to the spring means-induced return displacement of the cam-follower-shafts from retracted to initial positions.

18. A mechanism as called for in claim 17, wherein the simultaneous displacements of the cam-follower-shafts incident to rotation of the cam follow duplicate paths of identical parabolic curves.

19. A mechanism as called for in claim 17, wherein each of said duplicate cam surfaces, cam-followers, cam-follower shafts and spring means augment and duplicate the characteristics of the other of said corresponding duplicate means.

20. A mechanism as called for in claim 17, which includes means for independently adjusting the pre-load on each of said spring means.

21. In combination with a control member having a shaft which is rotatable for a maximum of less than 360° in either direction between first and second positions, and an actuator having a shaft which is rotatable for a maximum of less than 360° in either direction between first and second positions which correspond to the said first and second positions of the control member shaft, and means for rotating the shaft of the actuator between said first and second positions;
   the improvement which comprises the use of a cam-actuated spring-return mechanism for automatically and simultaneously rotating the shafts of said control member and said actuator from their respective second positions to first positions incident to the release or impairment of the means by which said actuator shaft was rotated from its first position to its second position.

22. The combination as called for in claim 21, wherein said cam-actuated spring-return mechanism includes a shaft, and means for interconnecting the shafts of the control member, the actuator and the cam-actuated spring-return mechanism in driving and driven relationship.

23. The combination as called for in claim 21, wherein said cam-actuated spring-return mechanism includes a cam and rotation of the actuator shaft from its its first position to its second position rotates the shaft of the cam-actuated spring-return mechanism by a like amount against the counterforce of the spring means of said mechanism.

24. The combination as called for in claim 21, wherein said cam-actuated spring-return mechanism includes a cam and the profile of the cam of said cam-actuated spring-return mechanism is such that the torque output of said mechanism meets the torque requirements of the control member.

25. The combination which comprises:
   a. a control member having a shaft which is rotatable in either direction for a maximum of less than 360° between first and second positions,
   b. an actuator having a shaft which is rotatable in either direction for a maximum of less than 360° between first and second positions which correspond to the first and second positions of the shaft of the control member;
   c. means for imparting a rotary motion to the actuator shaft, in one direction, from said first position to said second position;
   d. a cam-actuated, spring-return mechanism having spring means and a shaft which is rotatable in one direction from a first position to a second position against the counterforce of said spring means, and which is rotatable in an opposite direction from the second position to the first position by said spring means, said shaft having a cam mounted thereon, said shaft having its longitudinal axis normal to the axis along which said spring means exerts its force;
   e. means interconnecting the shafts of said control member, said actuator and said cam-actuated, spring-return mechanism in driving-driven relationship whereby the control member and cam-actuated, spring-return mechanism shafts are simultaneously rotated from the first positions to the second positions incident to rotation of the actuator shaft by said imparting means, and wherein the actuator and control member shafts are simultaneously rotated from the second positions to the first positions by the shaft of the cam-actuated, spring-return mechanism incident to cessation or release of said imparting means;

f. and the cam of said cam-actuated, spring-return mechanism having a profile such that the torque imparted to the shaft of the control member in rotating it from its first position to its second position is at least equal to the torque applied to the shaft of the control member by the shaft of the cam-actuated, spring-return mechanism in rotating the shaft of said control member in the opposite direction from its second position to its first position.

26. The combination as called for in claim 25, wherein the cam on the shaft imparts a compressive force via a cam-follower to said spring means incident to the cam-actuated displacement of the cam follower, and wherein the profile of the cam, in conjunction with the spring rate of the preloaded spring means, is such as to provide a predetermined torque to the shaft of said mechanism incident to release of the spring means from compressed to an initial preload condition.

27. The combination as called for in claim 25, wherein the cam-actuated, spring-return mechanism is disposed between the actuator and the control member.

28. The combination as called for in claim 25, wherein opposite ends of the shaft of the cam-actuated spring-return mechanism are externally accessible for driving-driven connection with other shafts.

29. A cam-actuated, spring-return mechanism which includes a cam shaft rotated a maximum of less than 360° in one direction from a first position to a second position when an external torque is applied thereto, a cam mounted on said shaft, a preloaded spring having a given spring rate, and a cam follower interposed between said cam and said spring, said cam shaft having its axis substantially normal to the axis along which said spring applies its force, wherein, a. the force on the spring is a function of the initial preload as augmented by displacement of the cam follower incident to rotation of the cam in the one direction by rotation of said cam shaft from its first position to its second position;

b. the cam profile is defined by a plurality of equivalent radii each of which is a function of the instantaneous velocity of the cam follower for a given position of the cam as it rotates;

c. and the torque output of the cam shaft is proportional to the product of said force on the spring and the equivalent radii at each particular position of the cam as said cam shaft is rotated in the opposite direction from its second position to its first position when the external torque ceases to be applied.

30. A mechanism as called for in claim 29, wherein displacement of the cam follower follows a parabolic curve incident to rotation of the cam and wherein the product of the force on the spring and the equivalent radius of the cam is constant, whereby the spring-return-actuation of the cam is constant, and the spring-return-actuation of the cam imparts a constant torque to the cam shaft to rotate the cam shaft in the opposite direction from its second position to its first position.

31. A mechanism as called for in claim 29, wherein the equivalent radii of paragraph "b" are a function of the first derivative of the displacement of the cam follower, and wherein the torque output of paragraph "c" is proportional to the product of the cam follower displacement and the first derivative of the cam follower displacement and wherein the cam follower displacement is of such a mathematical function that its first derivative is equal to the reciprocal of the original function, times a constant.

32. A cam-type, spring-return mechanism which includes a cam rotatable for a maximum of less than 360° in one direction from a first position to a second position when an external torque is applied, a preloaded spring having a given spring rate and a cam follower interposed between said cam and spring, and a torque is imparted to the cam by the spring to rotate the cam in the opposite direction from the second position to the first position upon the external torque ceasing wherein the torque imparted to the cam when the spring is of a non-linear type is defined by the equation:

$$T = \left( Fi + Ra\left[ \sqrt{yi^2 + \frac{2\theta}{\pi}(ye^2 - yi^2)} - yi \right] \right) \left( \frac{ye^2 - yi^2}{\pi\sqrt{yi^2 + \frac{2\theta}{\pi}(ye^2 - yi^2)}} \right)$$

wherein
T = torque
Fi = initial preload on the spring
Ra = the average spring rate over the working range (ye-yi)
$\theta$ = radians through which the cam is rotated
yi and ye = the initial and end ordinates of the segment of a parabola, which defines the overall lift of the cam and the total displacement of the cam follower.

33. A mechanism as called for in claim 32, wherein the torque imparted to the cam by a linear spring which has a constant spring rate, is defined by the equation:

$$T = \frac{R(ye^2 - yi^2)}{\pi}$$

wherein
R = the spring rate of the spring.

34. A mechanism as called for in claim 32, wherein rotation of the cam through 90° in the one direction compresses the spring and displaces the cam follower according to the equation:

$$y = \sqrt{yi^2 + \frac{2\theta}{\pi}(ye^2 - [yi^2])}$$

wherein
Y = displacement of the cam follower and spring
$\theta$ = radians through which the cam is rotated.

35. A cam-actuated, spring-return mechanism including:

a cam shaft rotatable for a maximum of less than 360° in one direction from a first position to a second position when an external torque is applied thereto;

a cam mounted on said cam shaft for rotation therewith;

cam follower means cooperating with the surface of said cam;

spring means exerting a force on said cam follower means substantially normal to the longitudinal axis of said cam shaft to maintain said cam follower means in engagement with the surface of said cam;

and said spring means having its force increased by compression when said cam shaft is rotated from its first position to its second position and applying its force by release of the compressed force through said cam follower means to rotate said cam shaft in the opposite direction from its second position to its first position when the external torque ceases to be applied to said cam shaft.

36. The mechanism according to claim 35 in which said cam shaft includes means to connect said cam shaft to actuating means and control means so that said cam shaft has the external torque applied thereto by the actuating means to rotate said cam shaft in the one direction and said cam shaft applies its output torque to the control means when said cam shaft is rotated in the opposite direction by said spring means.

37. The mechanism according to claim 35 in which:
said cam follower means includes:
a cam follower maintained in engagement with the surface of said cam by said spring means;
and a cam follower shaft having said cam follower connected to one end thereof;
said cam follower shaft has its longitudinal axis substantially normal to the longitudinal axis of said cam shaft;
and said spring means acts on said cam follower shaft to exert its force on said cam follower.

38. The mechanism according to claim 35 in which:
said cam shaft has its longitudinal axis vertically disposed;
said cam follower means includes a cam follower maintained in engagement with the surface of said cam by said spring means;
and said cam follower is in a horizontal plane normal to said cam shaft.

39. The mechanism according to claim 38 in which:
said cam has a portion of its surface designed with a profile to cause said cam shaft to have a predetermined torque output curve produced from the force of said spring means to rotate said cam shaft in the opposite direction from its second position to its first position when the external torque ceases to be applied to said cam shaft;
and said cam shaft has means to apply the output torque in accordance with the predetermined torque output curve.

40. The mechanism according to claim 39 in which:
said cam follower means includes a cam follower shaft having said cam follower connected to one end thereof;
said cam follower shaft has its longitudinal axis substantially normal to the longitudinal axis of said cam shaft;
and said spring means acts on said cam follower shaft to exert its force on said cam follower.

41. The mechanism according to claim 40 in which the profile of the surface of said cam is a segment of a parabola not passing through its zero position or beginning at its zero point so that the output torque is constant.

42. The mechanism according to claim 41 in which said cam shaft rotates only 90° from its first position to its second position and vice versa.

43. The mechanism according to claim 39 in which the profile of the surface of said cam is a segment of a parabola not passing through its zero position or beginning at its zero point so that the output torque is constant.

44. The mechanism according to claim 43 in which said cam shaft rotates only 90° from its first position to its second position and vice versa.

45. The mechanism according to claim 38 in which:
said cam follower means includes a cam follower shaft having said cam follower connected to one end thereof;
said cam follower shaft has its longitudinal axis substantially normal to the longitudinal axis of said cam shaft;
and said spring means acts on said cam follower shaft to exert its force on said cam follower.

46. The mechanism according to claim 51 in which:
said cam has a portion of its surface designed with a profile to cause said cam shaft to have a predetermined torque output curve produced from the force of said spring means to rotate said cam shaft in the opposite direction from its second position to its first position when the external torque ceases to be applied to said cam shaft;
and said cam shaft has means to apply the output torque in accordance with the predetermined torque output curve.

47. The mechanism according to claim 46 in which the profile of the surface of said cam is a segment of a parabola not passing through its zero point or beginning at its zero point so that the output torque is a constant.

48. The mechanism according to claim 47 in which said cam shaft rotates only 90° from its first position to its second position and vice versa.

49. The mechanism according to claim 46 in which:
said cam follower means includes:
a cam follower maintained in engagement with the surface of said cam by said spring means;
and a cam follower shaft having said cam follower connected to one end thereof;
said cam follower shaft has its longitudinal axis substantially normal to the longitudinal axis of said cam shaft;
and said spring means acts on said cam follower shaft to exert its force on said cam follower.

* * * * *